(12) United States Patent
Kim et al.

(10) Patent No.: US 8,068,820 B1
(45) Date of Patent: Nov. 29, 2011

(54) SYSTEMS AND METHODS FOR PROVIDING DATA TO MOBILE STATIONS

(75) Inventors: Jeff Kim, Fairfax, VA (US); Nadia Bazarov, Herndon, VA (US); Abraham Kinney, Sterling, VA (US); Nathan Curtis, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 604 days.

(21) Appl. No.: 11/345,024

(22) Filed: Feb. 2, 2006

Related U.S. Application Data

(60) Provisional application No. 60/649,088, filed on Feb. 3, 2005.

(51) Int. Cl.
*H04M 3/42* (2006.01)
*H04M 1/725* (2006.01)

(52) U.S. Cl. ............... 455/414.1; 455/412.1; 455/412.2; 455/414.3; 455/415; 455/435.3

(58) Field of Classification Search ............... 455/412.1, 455/412.2, 414.1, 414.2, 414.3, 415, 435.3
See application file for complete search history.

(56) References Cited

U.S. PATENT DOCUMENTS

| | | | |
|---|---|---|---|
| 6,842,613 B2 | 1/2005 | Mittal | |
| 7,016,669 B2 | 3/2006 | Aerrabotu et al. | |
| 7,035,878 B1 * | 4/2006 | Multer et al. | 1/1 |
| 7,043,263 B2 | 5/2006 | Kaplan et al. | |
| 2002/0109718 A1 * | 8/2002 | Mansour et al. | 345/744 |
| 2004/0111518 A1 | 6/2004 | Schuyler | |
| 2004/0192386 A1 | 9/2004 | Aerrabotu et al. | |
| 2005/0251579 A1 * | 11/2005 | Ngo et al. | 709/234 |

OTHER PUBLICATIONS

U.S. Appl. No. 11/742,670, filed May 1, 2007, Dianda.

* cited by examiner

*Primary Examiner* — Charles Appiah
*Assistant Examiner* — Emem Stephen

(57) ABSTRACT

Systems and methods for providing data to mobile stations are provided. An administrator can select one or more mobile stations and different types of data. The administrator can also set a priority level for the selected data. The selected data is then formed into a package of data, which is then provided to the selected mobile stations. The selected mobile stations can then store the data in memory along with any previously stored data, using the priority level of the selected data to determine whether to overwrite or discard particular data.

17 Claims, 4 Drawing Sheets

SYSTEMS AND METHODS FOR PROVIDING DATA TO MOBILE STATIONS

The present application claims priority under 35 U.S.C. §119 to U.S. Provisional Application No. 60/649,088, filed Feb. 3, 2005, the entire contents of which are herein expressly incorporated by reference.

BACKGROUND OF THE INVENTION

The increasing availability of wireless network access, both wireless macro network access and wireless local area network access, has resulted in a large portion of the population using mobile stations. As used herein, a mobile station includes a wireless interconnect telephone, dispatch telephone, personal digital assistant (PDA), handheld data terminal and/or the like. These mobile stations can store various types of data including contacts, events, tasks and the like. Originally most mobile stations, such as wireless telephones, received data in an isolated fashion, wherein data was entered directly into the mobile station, and accessible only via the mobile station. However, recent advances have allowed data to be entered via one device, such as a personal computer, and synchronized with another device, such as a mobile station.

SUMMARY OF THE INVENTION

Current synchronization techniques operate in a one-to-one manner. Specifically, data for a specific user is synchronized only with the same data for that user. However, it would be desirable to synchronize a same set of data with a number of mobile stations, which may be owned and/or operated by different users. For example, a company or family may desire to have the same contacts or events stored for all employees of the company or members of the family. Accordingly, the present invention provides systems and methods for synchronizing a set of data with a number of mobile stations.

In accordance with exemplary embodiments of the present invention, an administrator, such as a company administrator or a head of household, can select a set of data that includes data from at least two different types of data. The selected data can then be provided to two or more mobile stations as a package of data. Priority levels can be assigned to the selected data, such that when a memory capacity of a mobile station may be exceeded by storing the package of data, either data in the package will be discarded or data previously stored in the memory can be discarded in favor of the data of the package.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
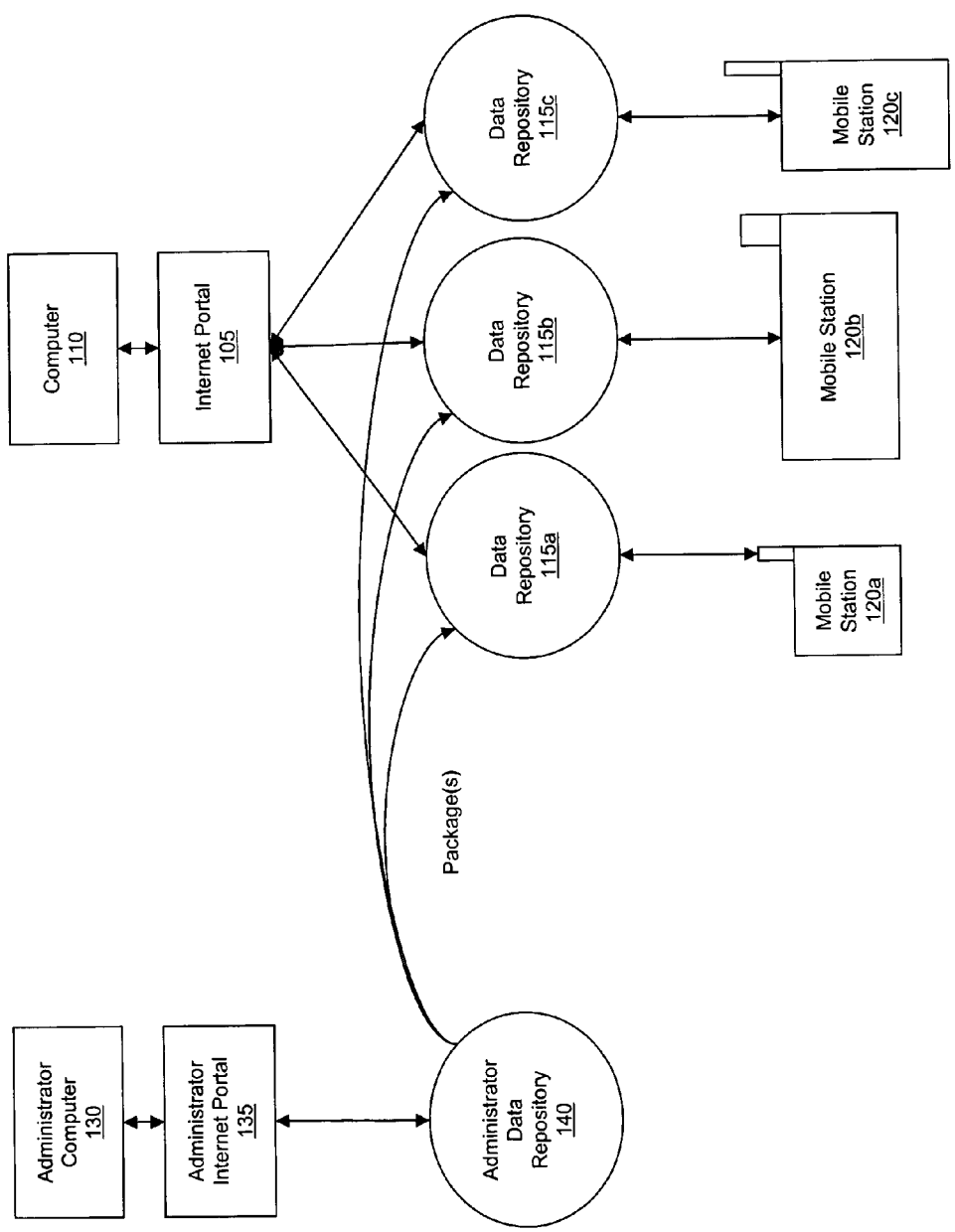
FIG. 1 is a block diagram of an exemplary system for providing packages of data to mobile stations.

FIG. 1 is a block diagram of an exemplary system for providing packages of data to mobile stations. The system includes an administrator computer 130 coupled to an administrator data repository 140 via an administrator internet portal 135. The administrator internet portal 135 can be a server, or an application executing on a server, for receiving data from administrator computer 130. Administrator computer 130 can be any type of computer, including a desktop computer, laptop computer or mobile station. The application can be a so-called "web form" which allows an administrator of a number of mobile stations to enter and select data for delivery to the mobile stations. As will be described in more detail below, the administrator internet portal 135 can use the entered and/or selected data to generate a package of data, and the package of data can be provided to one or more mobile stations. The administrator data repository 140 stores package data created by administrator internet portal 135 for delivery to mobile stations via information repositories 115a-115c. This data can include data selected from the types of data including contacts, events, tasks, home page, mobile station settings, or the like. Mobile stations settings include ring tones, wallpaper, or any other type of setting available for a mobile station.

The system also includes an internet portal 105 coupled between a computer 110 and data repositories 115a-115c. Computer 110 and internet portal 105 are similar to that of the administrator computer 130 and administrator internet portal 135 respectively, except that computer 110 and internet portal 105 are accessed by users of mobile stations instead of by an administrator of more than one mobile station. FIG. 1 illustrates separate computers 110 and 130 and separate internet portals 105 and 135 merely for ease of explanation. A user of computer 130, with the proper credentials, can access internet portal 105, and a user of computer 110, with the proper credentials, can access internet portal 135. Moreover, internet portals 105 and 135 can be hosted on the same or separate servers and/or can be the same program, the difference being the interface presented depending upon whether data for a single mobile station is being provided, or data for more than one mobile station is being provided.

Data repositories 115a-115c couple administrator information repository 140 and internet portal 105 with one or more mobile stations 120a-120c. Data repositories 115a-115c store various data for synchronization with mobile stations 120a-120c. This data can include data selected from the types of data including contacts, events, tasks, home page, mobile station settings, or the like. Data repositories 115a-115c merge any data received from internet portal 105 and administrator data repository 140 for delivery to mobile stations 120a-120c. However, the data received from internet portal 105 and administrator data repository 140 can be sent separately to the appropriate mobile stations. Mobile stations 120a-120c are illustrated in FIG. 1 as different sizes to illustrate that these may be different types of mobile stations with different memory capacities. However, a package can include information for the same types of mobile stations and/or mobile stations with the same amount of memory capacity. Although data repositories 115a-115c are illustrated as separate elements in FIG. 1, these data repositories can be part of the same network elements, such as different entries in a database or the like.

Figure 2:
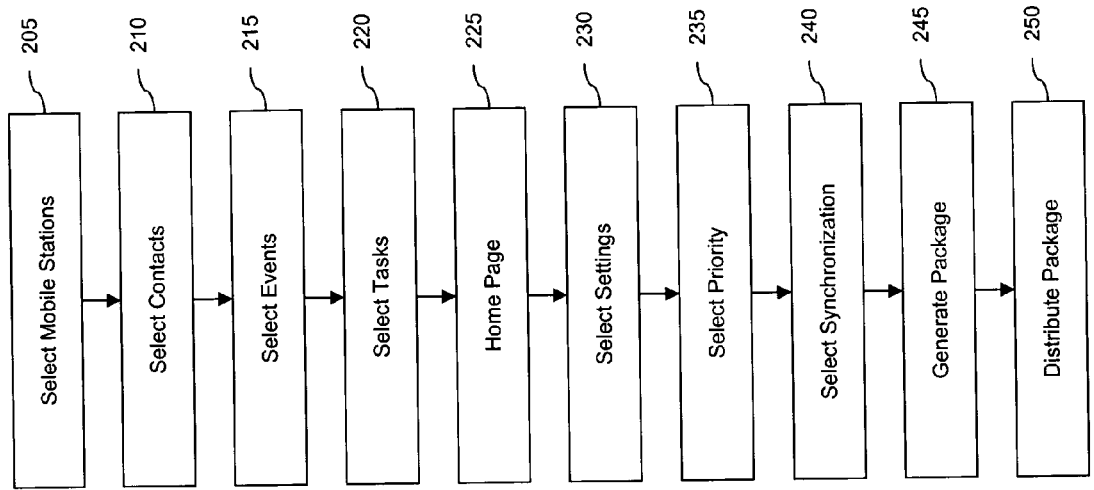
FIG. 2 is a flow diagram of an exemplary method for selecting data for a package.

FIG. 2 is a flow diagram of an exemplary method for selecting data for a package. Initially, an administrator accesses administrator internet portal 135 via administrator computer 130. The administrator internet portal 135 can request that the administrator provide credentials, such as a user name and password, before allowing access to the forms for generating packages for the mobile stations. The administrator then selects two or more mobile stations (step 205).

The mobile stations can be selected individually, or can be selected from a predetermined group of mobile stations, e.g., all mobile stations of a company or all mobile stations of a particular department of a company.

The administrator can then select data from different types of data such as contacts, events, tasks, a home page, or settings for use in generating a package of data for delivery to the selected mobile stations (steps 210-230). Although FIG. 2 illustrates selection of data from a number of different data types, an administrator need not select data from each data type.

It should be recognized that certain data such as a home page or certain settings, such as wallpaper, are "single entry" data, such that a mobile station can implement only one data setting. In contrast, other types of data, such as contacts, are "multi-entry" data such that the mobile station can store a number of different entries for this data type. Due to the single entry type data and the limited storage space of the memories of mobile stations, it may be necessary to determine which data is implemented by the mobile station (for single entry data) or what data is stored by the mobile station (for multi-entry data in a package that would exceed a memory capacity of a mobile station when stored in addition to existing data in the memory). Accordingly, an administrator can select a priority level for the selected data (step 235). The priority level can be implemented in a number of different ways. For example, a high and low priority level can be provided. The high priority level indicates that the data in the package overwrites any conflicting data (due to single entry data limitations, memory capacity issues, or actual conflicting data), while a low priority level indicates that the data in the mobile station overrules any data in the package. Additionally, or alternatively, an "overwrite" priority can be provided where all data stored in the mobile station is erased and replaced by the data in the package. This may be useful for companies that desire a consistent set of data across all mobile stations for all, or a subset, of employees.

Once the administrator has finalized the data and priority levels for the selected data, the administrator selects a synchronization option (step 240). A package of the data is then generated (step 245) and distributed to the selected mobile stations via administrator data repository 140 and data repositories 115a-115c (step 250).

The administrator internet portal 135 can be setup to allow multiple administrators access to the same data, mobile stations and packages. These multiple administrators may have different access rights to the data, mobile stations and packages. For example, one or more administrators may be allowed to add, edit or delete data, mobile stations or packages, while other administrators may only have a subset of these access rights. In order to assist an administrator in creating packages, the administrator internet portal 135 can identify the memory capacity of the smallest or largest mobile station of the selected mobile stations. The administrator may also send data to mobile stations that is not part of a package. Additionally, an administrator can duplicate an existing package to create a new package with more or less data.

Figure 3A:
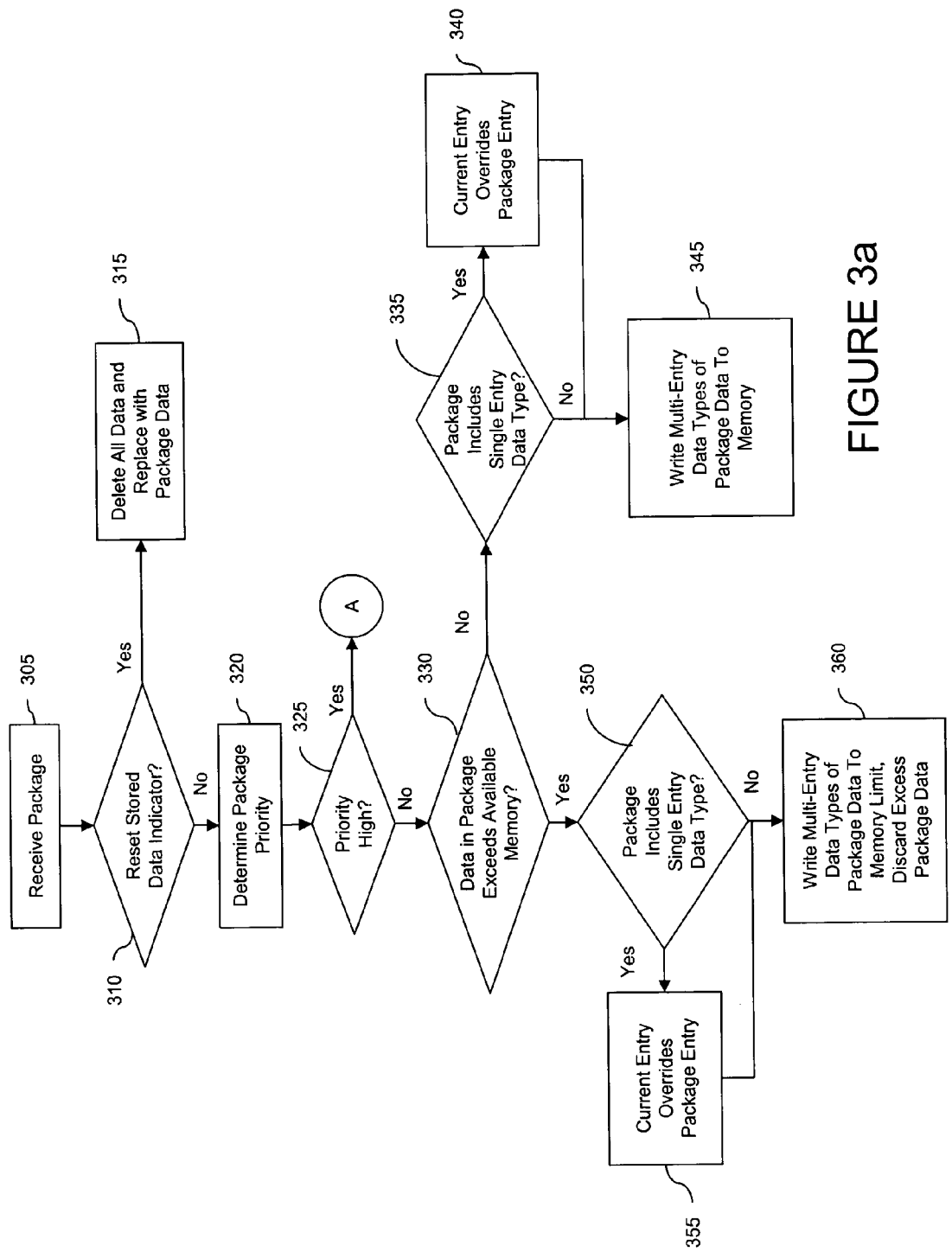
FIGS. 3a and 3b are flow diagrams of an exemplary method for storing package data by a mobile station.
Figure 3B:
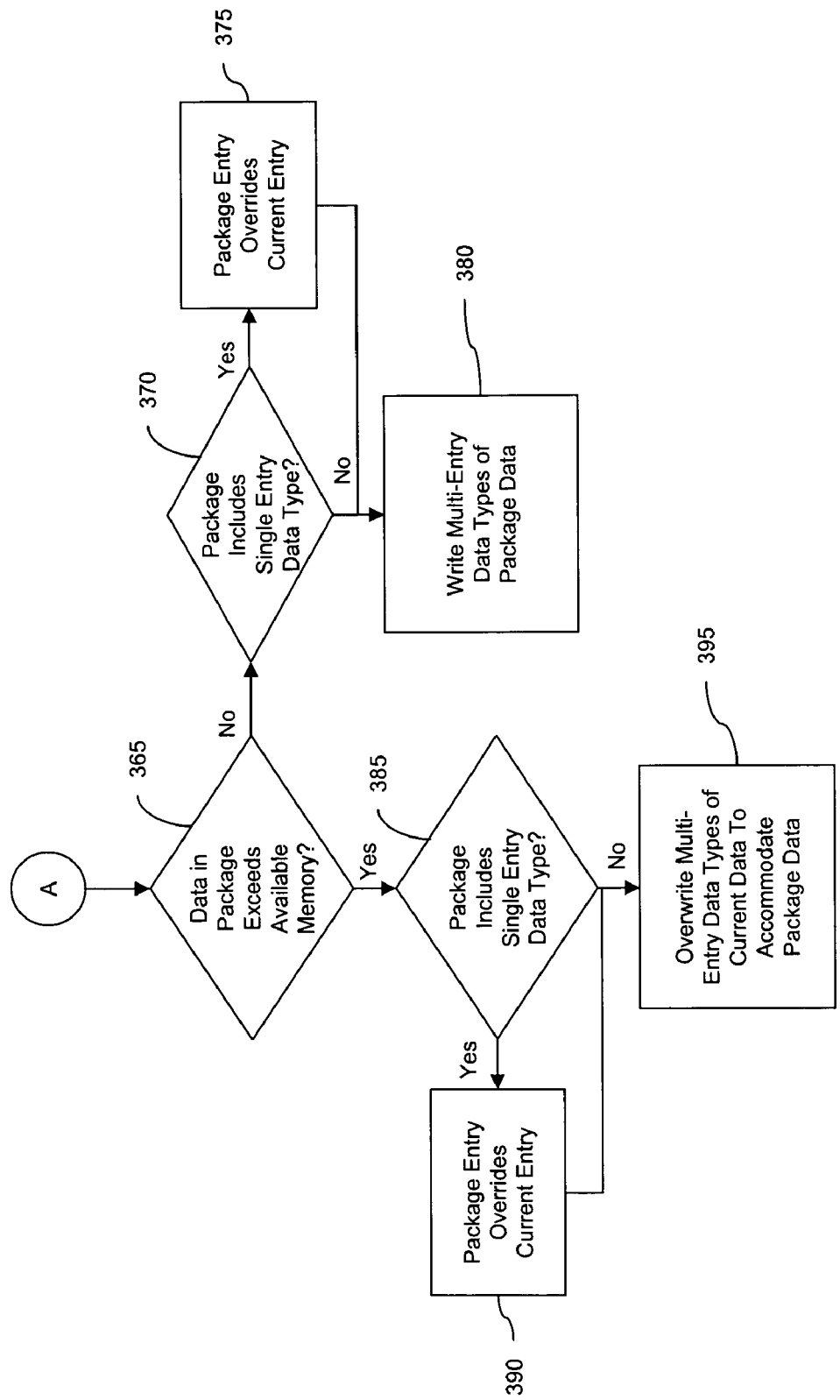

FIGS. 3a and 3b are flow diagrams of an exemplary method for storing package data by a mobile station. When a mobile station receives a package (step 305), the mobile station determines whether the package includes a reset stored data indicator (step 310). When the package includes a reset stored data indicator ("Yes" path out of decision step 310), then the mobile station deletes all data in the mobile station's memory and replaces it with the data in the package (step 315).

When the package does not include a reset stored data indicator ("No" path out of decision step 310), then the mobile station determines the priority of the package (step 320). When the priority of the package is a low priority level ("No" path out of decision step 325), then the mobile station determines whether the amount of data in the data package, along with any previously stored data, exceeds the available memory of the mobile station (step 330). When the data in the package with the previously stored data does not exceed the available memory of the mobile station ("No" path out of decision step 330), then the mobile station determines whether the package includes any data of a single entry data type (step 335). When the package includes data of a single entry data type ("Yes" path out of decision step 335), then the mobile station's current entry overrides that of the package (step 340). For example, if package includes a wallpaper and the mobile station already has a wallpaper set, the mobile station will maintain its current wallpaper setting.

When the package does not include any data of a single entry data type ("No" path out of decision step 335), or after the mobile station has handled any data of the single entry data type (step 340), the mobile station writes the data of the multi-entry data types in the package to the memory (step 345).

When the data in the package with the previously stored data exceeds the available memory of the mobile station ("Yes" path out of decision step 330), then the mobile station determines whether the package includes any data of a single entry data type (step 350). When the package includes data of a single entry data type ("Yes" path out of decision step 350), then the mobile station's current entry overrides that of the package (step 355). When the package does not include any data of a single entry data type ("No" path out of decision step 350), or after the mobile station has handled any data of the single entry data type (step 355), the mobile station writes the data of the multi-entry data types in the package to the memory up to the memory limit and discards any excess data from the package (step 360). The particular data to be discarded can be determined in any number of different ways. For example, a priority scheme can be implemented between different data types of the package data, such that all data of a particular data type will be written to the memory before data of other data types. Within data types, other priority schemes can be implemented, such as writing the data in alphabetical or chronological order, as appropriate.

When the priority of the package is a high priority level ("Yes" path out of decision step 325), then the mobile station determines whether the amount of data in the data package, along with any previously stored data, exceeds the available memory of the mobile station (step 365). When the data in the package with the previously stored data does not exceed the available memory of the mobile station ("No" path out of decision step 365), then the mobile station determines whether the package includes any data of a single entry data type (step 370). When the package includes data of a single entry data type ("Yes" path out of decision step 370), then the mobile station's current entry overrides that of the package (step 375). When the package does not include any data of a single entry data type ("No" path out of decision step 370), or after the mobile station has handled any data of the single entry data type (step 375), then the mobile station writes the data of the multi-entry data types in the package to the memory (step 380).

When the data in the package with the previously stored data exceeds the available memory of the mobile station ("Yes" path out of decision step 365), then the mobile station determines whether the package includes any data of a single entry data type (step 385). When the package includes data of a single entry data type ("Yes" path out of decision step 385), then the mobile station's current entry overrides that of the package (step 390). When the package does not include any data of a single entry data type ("No" path out of decision step 385), or after the mobile station has handled any data of the single entry data type (step 390), then the mobile station writes the data of the multi-entry data types in the package to the memory and discards any excess previously stored data (step 395). The particular previously stored data to be discarded can be determined using any of the priority schemes described above with regard to discarding of excess package data.

Although exemplary embodiments of the present invention have been described in connection with a single package of data, the present invention is equally applicable to a number of packages of data. For example, an administrator can create any number of packages of data for distribution to mobile stations at approximately the same time. A mobile station may be selected to receive a first package with a first group of mobile stations and also selected to receive a second package with a second group of mobile stations. The first and second groups of mobile stations can include any number of the same mobile stations. Moreover, the first and second packages of data can include some or all of the same data, in addition to different data. Additionally, priority levels can be assigned to each of the packages relative to other packages, or default priorities, such as priority based on the alphabetical name of the package, can be employed between packages. Alternatively, the priority between packages can be based upon packages assigned specifically to the mobile station, packages assigned to a sub-account that the mobile station is associated with, and packages assigned to an account that the mobile station is associated with.

Although exemplary embodiments have been described with the mobile station managing the replacement of data based upon priorities, when a data repository 115a-115c has data for one of the mobile stations, the data repository can manage the replacement of data between data supplied from internet portal 105 and data supplied from administrator data repository 140.

In certain situations in may be desirable to disable the ability for the user of the mobile station to modify or delete stored data from a data package. This may be achieved by including an indicator in the package, which when recognized by the mobile station, will mark the data as protected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing data to mobile stations, the method comprising the acts of:
   receiving an identification of at least two mobile stations;
   receiving a selection of data of at least two different data types selected from the data types comprising contacts, events, tasks, or home page;
   forming a package of the selected data, the package including selected contacts, events, tasks or home page;
   forwarding the package to each of the at least two mobile stations,
   receiving a priority level for the data; and
   including the priority level in the package,
   wherein when storing the data in a memory of one of the mobile stations would exceed a capacity of the memory, the priority level indicates that existing data in the at least two mobile stations is not overwritten by the data.

2. The method of claim 1, wherein the contacts, events and tasks are multi-entry data and the home page is single entry data.

3. The method of claim 2, wherein the act of forwarding the package comprises the acts of:
   forwarding the package to a data repository; and
   forwarding, by the data repository, the package to each of the at least two mobile stations.

4. The method of claim 3, wherein the data repository forwards the package to another data repository, which forwards the package to a wireless network infrastructure, which provides the package to the at least two mobile stations.

5. The method of claim 2, wherein the identification and selection are received by an internet portal.

6. The method of claim 2, wherein the at least two mobile stations are associated with a same wireless network account.

7. The method of claim 6, wherein the wireless network account is associated with a company.

8. The method of claim 6, wherein the wireless network account is associated with a family.

9. A method for providing data to mobile stations, the method comprising the acts of:
   providing, to an administrator of the mobile stations, access to a data entry form;
   forming a package of data of at least two different data types based on information entered into the data entry form, wherein the data of the at least two different data types are selected from the data types comprising contacts, events, tasks, or home page, and wherein the package includes selected contacts, events, tasks or home page; and
   forwarding the package to a data repository for delivery to the mobile stations, receiving a priority level for the data; and
   wherein the package includes a priority for the data, and
   wherein when storing the data in a memory of one of the mobile stations would exceed a capacity of the memory, the priority level indicates that the data overwrites existing data in the at least two mobile stations.

10. A method for providing data to mobile stations, the method comprising the acts of:
    providing, to an administrator of the mobile stations, access to a data entry form;
    forming a package of data of at least two different data types based on information entered into the data entry form, wherein the data of the at least two different data types are selected from the data types comprising contacts, events, tasks, or home page, and wherein the package includes selected contacts, events, tasks or home page; and
    forwarding the package to a data repository for delivery to the mobile stations, receiving a priority level for the data,
    wherein the package includes a priority for the data, and
    wherein when storing the data in a memory of one of the mobile stations would exceed a capacity of the memory, the priority level indicates that existing data in the at least two mobile stations is not overwritten by the data.

11. The method of claim 9, wherein the data repository forwards the package to another data repository, which forwards the package to a wireless network infrastructure, which provides the package to the at least two mobile stations.

12. The method of claim 9, wherein the data entry form is accessible via the internet.

13. The method of claim 9, wherein the at least two mobile stations are associated with a same wireless network account.

14. The method of claim 13, wherein the wireless network account is associated with a company.

15. The method of claim 13, wherein the wireless network account is associated with a family.

16. A method for providing data to mobile stations, the method comprising the acts of:
- receiving an identification of at least two mobile stations;
- receiving a selection of data of at least two different data types selected from the data types comprising contacts, events, tasks, or home page;
- forming a package of the selected data, the package including selected contacts, events, tasks or home page;
- forwarding the package to each of the at least two mobile stations receiving a priority level for the data; and
- including the priority level in the package,
- wherein when storing the data in a memory of one of the mobile stations would exceed a capacity of the memory, the priority level indicates that the data overwrites existing data in the at least two mobile stations.

17. The method of claim 1, wherein the contacts, events and tasks are multi-entry data and the home page is single entry data.

* * * * *